F. J. LOWRY.
TROLLEY GUARD.
APPLICATION FILED NOV. 30, 1920.
1,373,340.
Patented Mar. 29, 1921.
2 SHEETS—SHEET 1.
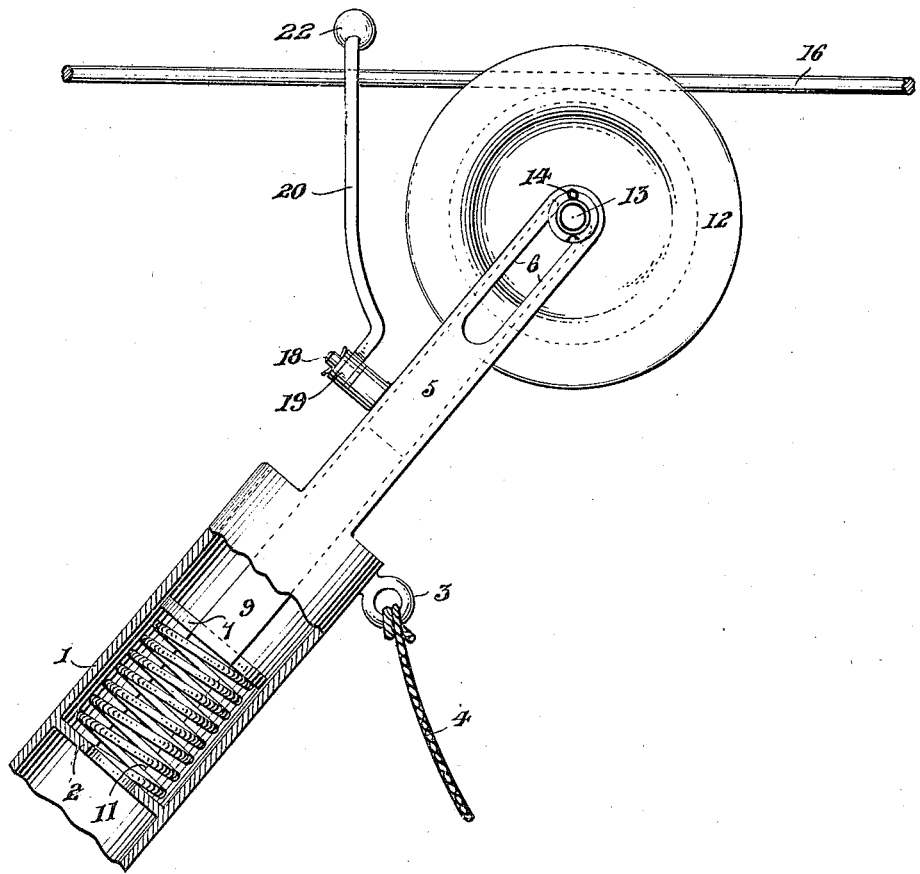
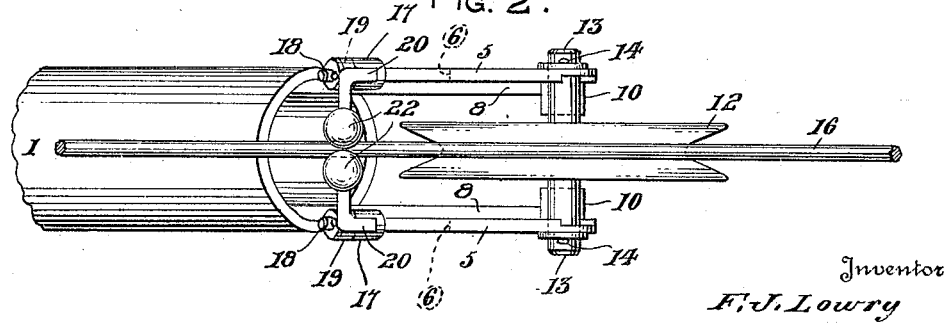
Inventor
F. J. Lowry
By J. H. Bryant
Attorney F. J. LOWRY.
TROLLEY GUARD.
APPLICATION FILED NOV. 30, 1920.
1,373,340. Patented Mar. 29, 1921.
2 SHEETS—SHEET 2.
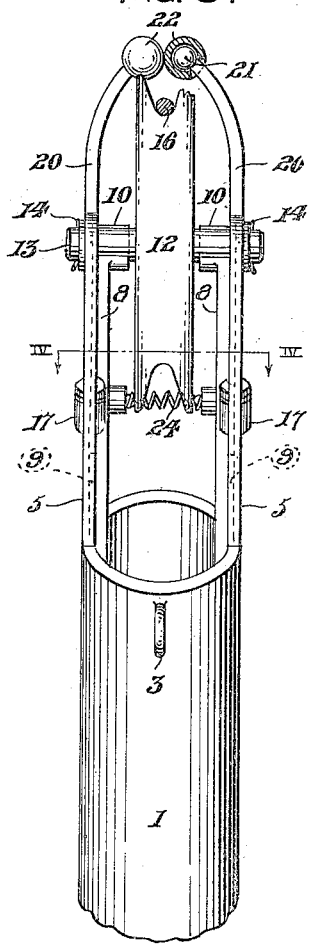
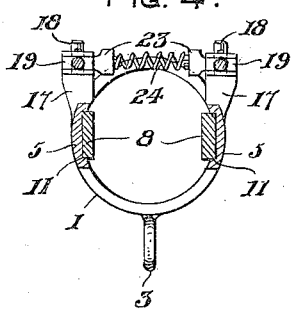
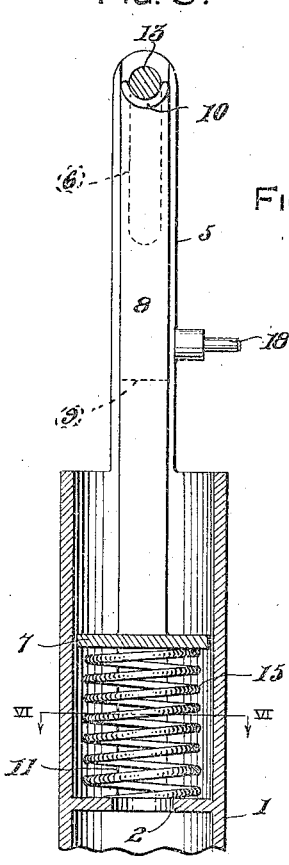
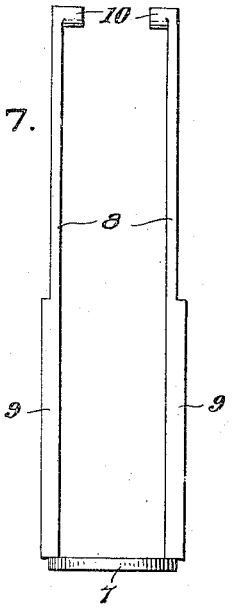
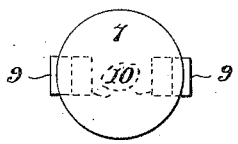
Inventor
F. J. Lowry
By J. K. Bryant
Attorney.

UNITED STATES PATENT OFFICE.

FRANK J. LOWRY, OF NEW ORLEANS, LOUISIANA, ASSIGNOR OF ONE-HALF TO HENRY J. GASSIE, OF NEW ORLEANS, LOUISIANA.

TROLLEY-GUARD.

1,373,340.　　　　　　　　Specification of Letters Patent.　　　Patented Mar. 29, 1921.

Application filed November 30, 1920. Serial No. 427,405.

*To all whom it may concern:*

Be it known that I, FRANK J. LOWRY, a citizen of Poland, residing at New Orleans, in the county of Orleans and State of Louisiana, have invented certain new and useful Improvements in Trolley-Guards, of which the following is a specification.

This invention relates to certain new and useful improvements in trolley guards and has for one of its objects to provide a resiliently mounted trolley wheel with tensioned guard arms carried by the trolley harp adapted to overlie the trolley wire to maintain the trolley wheel in running connection with the wire.

With the above and other objects in view, the present invention consists in the novel form, combination and arrangement of parts hereinafter more fully described in connection with the accompanying drawings, and in which like reference characters indicate similar parts throughout the several views.

In the drawings,

Figure 1 is a side elevational view partly in section of a trolley wheel and harp in operative position upon a section of trolley wire, Fig. 2 is a top plan view of the same, Fig. 3 is a front elevational view of the upper end of a trolley pole, partially in section, Fig. 4 is a horizontal sectional view taken on line IV—IV of Fig. 3 showing the resilient connection between the trolley wheel guard arms, Fig. 5 is a longitudinal sectional view showing the resilient support for the trolley wheel, Fig. 6 is a horizontal sectional view taken on line VI—VI of Fig. 5, showing the guide slots in the trolley pole for the resilient wheel mount, Fig. 7 is a side elevational view of the wheel mount removed from the trolley pole, Fig. 8 is a top plan view thereof showing the sockets carried by the side arms of the wheel mount for supporting the wheel bearing, and Fig. 9 is a bottom plan view of the wheel mount.

Referring more in detail to the accompanying drawings, there is illustrated a trolley wheel and guard mounted upon the upper end of a tubular trolley pole 1 having a transverse partition 2 therein spaced from the upper end of the pole and a side ring 3 to which a rope 4 is attached for shifting the pole 1 to its different positions. The upper end of the pole 1 is provided with a pair of alined oppositely disposed arms 5 having the upper ends thereof provided with elongated slots 6 for purposes presently to appear.

The trolley wheel mount is shown more clearly in Figs. 7 to 9, the same comprising a disk bottom 7 carrying a pair of oppositely disposed elongated arms 8 having side guide ribs 9 while the upper ends of the arms 8 carry inwardly directed opposed semicircular bearing brackets 10. The wheel mount is disposed within the open upper end of the pole 1 with the arm ribs 9 guided in opposite slots 11 formed upon the inner face of the pole 1, as clearly shown in Figs. 4 and 6, the wheel mount being prevented from rotation by the interlocking engagement of the mount with the trolley pole.

The trolley wheel 12 being of usual construction carries a bearing axle 13 supported in the bracket seats 10 of the wheel mount arms, the bearing axle 13 slidably extending through the opposite slots 6 in the pole arms 5 and retained against displacement by the end cotters 14 positioned outwardly of the pole arms 5 as shown in Figs. 1 and 3. An expansion coil spring 15 is interposed between the pole partition 2 and the disk base 7 of the wheel mount to normally force the wheel mount in an outward direction as shown in Fig. 5 while the outer closed ends of the arm slots 6 limit the outward movement of the wheel axle 13, maintaining a revoluble mounting of the wheel axle upon the wheel mount arms 8 as clearly illustrated.

To provide for a proper tracking of the trolley wheel 12 upon the trolley wire 16 as shown in Figs. 1 to 3, each of the pole arms 5 are provided with brackets 17 extending outwardly therefrom, each carrying a spindle 18 as shown in Figs. 4 and 5 upon which a block 19 is revolubly mounted, the blocks 19 carrying guard arms 20 having the upper ends thereof projecting above the upper plane of the trolley wheel 12 and directed toward each other as shown in Fig. 3 to overlie the trolley wire 16, the upper adjacent ends of the arms 20 being formed with ball heads 21 inclosed in rolling casings 22 so that during movement of the trolley wheel and mount when in operation, the casing heads when contacting the wire 16 will be permitted to shift upon the arm heads 21 for the purposes of reducing the friction. To hold the outer ends of the arms in contact with each other as shown in Figs. 2 and 3, each block 19 of the arms 20 carries an inwardly directed lug 23 connected by a coil spring 24 outwardly of the stub shafts 18, the springs tending to move the outer ends of the arms toward each other to substantially lock the same above the trolley wire 16 and retain the trolley wheel in proper tracking engagement with the wire.

In the operation of the device, assuming that the pole 1 is displaced from the trolley wire 16, the rope 4 is engaged to move the trolley wheel in contact with the wire, the spring 24 connecting the guard arm 20 permitting an opening movement of the guard arms when contacting the wire and placing the wheel 12 thereon. The resilient mounting of the trolley wheel support provides for a shifting movement of the trolley wheel relative to the pole 1 when obstructions are encountered on the wire 16 while the guard arms 20 having the outer ends thereof resiliently maintained in contact or engagement will insure the proper tracking of the wheel 12 upon the wire 16. The arm ribs 8 of the wheel mount being guided in the pole slots or grooves 11, the wheel 12 and mount therefor are prevented from rotary movement within the trolley pole while a relatively free longitudinal cushioned movement of the wheel and mount therefor is permitted.

While there is herein shown and described the preferred embodiment of the invention, it is nevertheless to be understood that minor changes may be made in the novel form, combination and arrangement of parts herein described without departing from the spirit and scope of the invention as claimed.

What is claimed as new is:

1. A trolley wheel mount comprising in combination with a tubular pole, a mounting frame resiliently disposed within said pole for longitudinal movements, a trolley wheel carried by the outer end of said frame and coöperating means carried by the frame and pole to prevent rotary movement of the frame, said pole and frame being constructed to provide a bearing support for the trolley wheel, the pole limiting the outward movement of the trolley wheel and frame relative thereto.

2. A trolley wheel mount comprising in combination with a tubular pole, a mounting frame resiliently disposed within said pole for longitudinal movements, a trolley wheel carried by the outer end of said frame, coöperating means carried by the frame and pole to prevent rotary movement of the frame and resiliently mounted guide arms carried by the pole with the upper ends thereof overlying a trolley wire.

3. A trolley wheel mount comprising in combination with a tubular pole, a mounting frame resiliently disposed within said pole for longitudinal movements, a trolley wheel carried by the outer end of said frame and coöperating means carried by the frame and pole to prevent rotary movement of the frame, said pole and frame being constructed to provide a bearing support for the trolley wheel, the pole limiting the outward movement of the trolley wheel and frame relative thereto, and resiliently mounted guard arms carried by the trolley pole with the upper ends thereof overlying a trolley wire.

4. A trolley pole comprising a tubular pole section, side arms projecting upwardly thereof with an elongated slot in each arm adjacent the outer ends, a trolley wheel mounting frame slidable within the upper end of said pole, said pole having opposite longitudinally extending grooves in the inner face thereof, opposite side arms carried by said frame slidable within the pole grooves, a trolley wheel supported at the outer ends of said arms, and wheel guard arms resiliently supported on the pole arms with the upper ends thereof overlying a trolley wire.

5. A trolley pole comprising a tubular pole section, side arms projecting upwardly thereof with an elongated slot in each arm adjacent the outer ends, a trolley wheel mounting frame slidable within the upper end of said pole, said pole having opposite longitudinally extending grooves in the inner face thereof, opposite side arms carried by said frame slidable within the pole grooves, a trolley wheel supported at the outer ends of said arms, wheel guard arms resiliently supported on the pole arms with the upper ends thereof overlying a trolley wire, a partition within said tubular pole and an extension coil spring between said pole partition and mounting frame for normally forcing the frame outwardly of the pole.

6. A trolley pole comprising a tubular pole section, side arms projecting upwardly thereof with an elongated slot in each arm adjacent the outer ends, a trolley wheel mounting frame slidable within the upper end of said pole, said pole having opposite longitudinally extending grooves in the inner face thereof, opposite side arms carried by said frame slidable within the pole grooves, a trolley wheel supported at the outer ends of said arms, wheel guard arms resiliently supported on the pole arms with the upper ends thereof overlying a trolley wire, a partition within said tubular pole, and an extension coil spring between said pole partition and mounting frame for normally forcing the frame outwardly of the pole, the pole and mounting frame arms coöperating to form a support for the trolley wheel and for limiting the upward movement thereof.

7. A trolley pole of the type described comprising a tubular pole section, upwardly directed side arms carried thereby, the outer ends of the arms having longitudinal slots formed therein, a wheel mounting frame disposed within said tubular trolley pole and having side arms slidably associated with the pole arms, the outer ends of the side arms of the mounting frame having inwardly directed grooved bearing brackets, a trolley wheel and axle having the axle disposed in the bracket bearings with the ends of the axle extending through the pole arm slots and a cushion spring for normally forcing the mounting frame outwardly of the trolley pole, the engagement of the wheel axle with the closed ends of the pole arm slots limiting the outward movement of the wheel and frame.

8. A trolley pole of the type described comprising a tubular pole section, upwardly directed side arms carried thereby, the outer ends of the arms having longitudinal slots formed therein, a wheel mounting frame disposed within said tubular trolley pole and having side arms slidably associated with the pole arms, the outer ends of the side arms of the mounting frame having inwardly directed grooved bearing brackets, a trolley wheel and axle having the axle disposed in the bracket bearings with the ends of the axle extending through the pole arm slots, a cushion spring for normally forcing the mounting frame outwardly of the trolley pole, the engagement of the wheel axle with the closed ends of the pole arm slots limiting the outward movement of the wheel and frame, and resiliently mounted guard arms for retaining the trolley wheel on a wire carried by the pole arms with the upper ends thereof directed toward each other and overlying a trolley wire.

In testimony whereof I affix my signature.

FRANK J. LOWRY.